Dec. 14, 1965  J. H. FABRICIUS  3,223,905

MIXED METAL-CERAMIC CAPACITOR

Filed Oct. 14, 1964

INVENTOR
John H. Fabricius

BY Connolly and Hutz

ATTORNEYS

United States Patent Office 3,223,905
Patented Dec. 14, 1965

3,223,905
MIXED METAL-CERAMIC CAPACITOR
John H. Fabricius, Bennington, Vt., assignor to Sprague Electric Company, North Adams, Mass., a corporation of Massachusetts
Filed Oct. 14, 1964, Ser. No. 405,649
4 Claims. (Cl. 317—258)

This is a continuation in part of application Serial No. 192,841, filed May 7, 1962, now abandoned.

The present invention relates to an electrical component combining ceramic-metallic dielectric layers and ceramic-metallic conducting layers, and more particularly to a capacitor combining alternate layers of dielectric and conductors of ceramic-metallic composition.

In the alternate layer type of electrical capacitors structure, there is built up a number of individual capacitors by successive layers of dielectric ceramic composition and conductive material. A representative dielectric ceramic is barium titanate and representative conductor is silver. The layers are built up to a desired number of dielectric and conductive layers to form a body. The conductive layers are arranged with respect to the dielectric layers so as to provide adjacent electrodes that are connected in a capacitive relationship to each other. One way of achieving this is to connect alternate electrode layers together by means of a pair of diametrically positioned contact electrodes.

This type of construction has utility in that it provides a relatively large capacitance in a relatively small volume. The resultant unit, however, is subject to thermal shock and sensitivity to temperature change. The continuous layers of dielectric of low thermal conductivity and the continuous layers of metal of high thermal conductivity in close and continuous physical contact develop stress under even normal conditions.

It is an object of this invention to provide a means and method for avoiding thermal sensitivity in an alternate layer type of capacitor structure.

It is another object of this invention to provide an alternate layer type capacitor which is resistant to thermal shock and reaches temperature equilibrium at a rapid rate.

A still further object of this invention is the provision of a novel capacitor containing high dielectric constant dielectrics with a small bulk and which can be readily manufactured in uniform quality.

Figure 1:
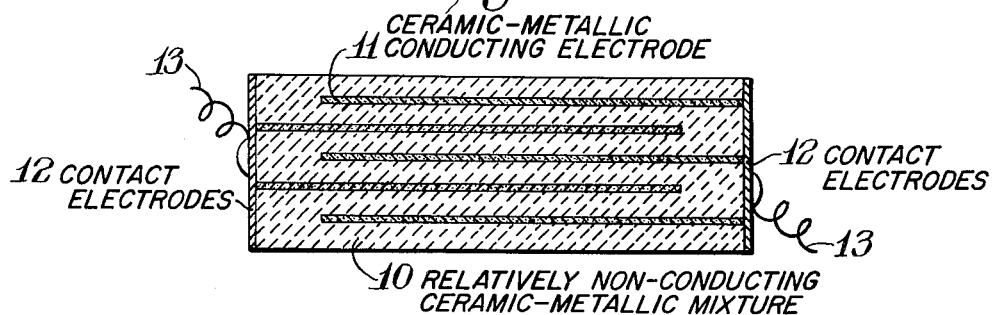
Figure 2:
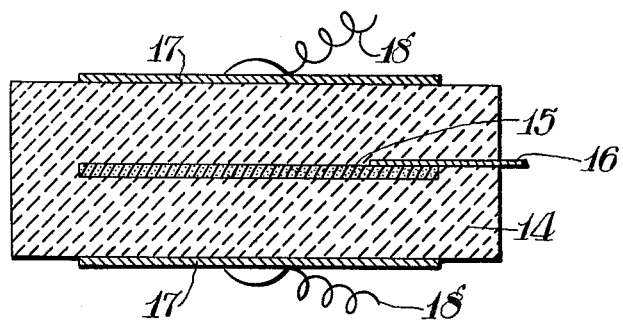

The above as well as still further objects of the present invention, will be more readily understood from the following description of its exemplifications, reference being made to the accompanying drawings in which:

FIGURE 1 is an end view of a build up of alternate layers of dielectric and staggered electrodes; and FIGURE 2 shows a cross section of a capacitor embodying a modification of this invention.

The capacitor of this invention has a thin layer of a relatively non-conducting ceramic-metallic composition, a relatively conducting layer on the layer of relatively non-conducting refractory material composed of the same ceramic-metallic composition but in a different ratio, another thin layer of relatively non-conducting ceramic-metallic composition and an electrode layer of relatively conducting ceramic-metallic composition on the last mentioned layer. All the layers forming a capacitor having an overall thickness of the order of several mils. The relatively conducting ceramic-metallic layers are sandwiched between the layers of the relatively non-conducting ceramic-metallic composition and extend to an edge of the sandwich. The alternate electrode layers extend to opposite sides of the sandwich and stop short of the alternate edges of the sandwich. A contact electrode layer on each side of the sandwich is in electrical contact with each set of the electrode layers. The relatively non-conducting ceramic-metallic composition forms a polycrystalline layer which is pervious and has a surface which for the purpose of this description can be considered as having discontinuities. The relatively conducting ceramic-metallic layer forms the layer of conducting material on this surface and this layer is in contact with the discontinuities of the surface.

Capacitors of the above type are easily reproducible. For example, in one embodiment the capacitor can be produced by applying to a supporting surface, a 1 or 2 mil thick layer of a slip of a high dielectric constant relatively non-conducting ceramic-metallic material, drying the layer, spraying on the dried layer a slip of relatively conducting ceramic-metallic composition, the second layer being sufficiently thick to form a combined layer of no more than a few mils after firing, drying the second layer, applying over the dried second layer another layer of high dielectric constant relatively non-conducting ceramic-metallic particles, drying the last mentioned layer, building up the overall thickness in the above manner to a structure of the order of 20 mils thickness and then removing the thus built up assembly from the support and then firing it to sinter the particles to each other.

In general the process of forming the ultimate layer structure disclosed in my copending application Serial No. 186,914, filed April 12, 1962 entitled Process for Capacitor may be employed in achieving the objects of this invention. The method of manufacture set forth in my above mentioned copending application modified in accordance with the above noted general description of the process for producing this invention provides a suitable method of this invention. In the process of this invention the formation of the layer of conducting material is related to the step of applying a strip of metal electrode in my above mentioned application. Insofar as it is consonant with the purpose and spirit of this application, the disclosure of my above mentioned application is incorporated herein by reference.

The ceramic-metallic compositions which make up both the layers of dielectric and the layers of electrode material in a unit of this invention are composed of a combination of the same ceramic and same metal in varying ratios. The ratios vary according to the characteristic of the particular layer which the composition constitutes. Among the suitable ceramic-metallic compositions are palladium-barium titanate; chromium-silicon monoxide and gold-magnesium fluoride. For the purposes of this invention magnesium fluoride is considered a ceramic material. Each of these compositions may be made up as refractories with varying percentages of the two elements making up the composition. In each of these compositions as the ratio between the metal and ceramic elements is changed so also the characteristics of the resultant composition will change. One of the characteristics thus effected by the ratio between metal and ceramic is the conductivity and the insulation factor of the composition. With each of these ceramic-metallic compositions there is a critical proportion on one side of which the composition is predominantly conductive and on the other side of which the composition is predominantly insulative. For example, to be an insulative composition of barium titanate-palladium the composition must be at least 90% barium titanate and less than 10% palladium. According to this invention, the dielectric layers are made up of the compositions in the ratio of metal-to-ceramic where the predominantly insulating characteristics prevail. On the other hand, the electrode layers are made up of the compositions in the ratios where the conductive characteristics predominate.

The nature of the conducting and non-conducting layers is also determined by the relative mobility of the elements making up the compositions in these layers. The elements which are more mobile relatively are used according to this invention in percentages less than 50% and preferably nearer 20%. On the other hand, the relatively immobile substances such as chromium and silicon monoxide, are used in percentages in excess of 50%. For example, gold-magnesium fluoride is relatively non-conducting below 20% gold. Therefore the critical amount of gold in gold-magnesium fluoride is around 20%. Compositions containing more than one part of gold to 4 parts of magnesium fluoride tend to be conductive whereas compositions having less gold than one part out of 5 are relatively non-conductive. The melting point of magnesium fluoride is 1396 degrees centigrade. The gold-magnesium fluoride compositions may be laid down in the alternate conductive and non-conductive layers by applying a slip of magnesium fluoride and simultaneously evaporating gold over the deposited slip. The percentage of gold can therefore be varied in the successive deposition steps. In this process first a relatively non-conductive layer would be laid down in atmosphere of vaporized gold to provide a ceramic-metallic composition in which the gold would be less than 20%. In the next succeeding step the relatively conductive layer would be laid down in an atmosphere of vaporized gold to provide a percentage of gold in excess of 20%. The successive steps could be repeated to provide the alternate layer type of structure according to this invention.

It will be understood that the conductive layer provided by this invention will have a discontinuous surface while providing an area of relatively greater conductivity. This area of relatively greater conductivity is capable of serving as a capacitor electrode separated from its adjacent electrode by the area of resistivity. The area of greater resistivity is provided by the relatively non-conductive ceramic-metallic composition.

The capacitors of the present invention comprise a plurality of relatively non-conducting and relatively conducting layers, said non-conducting layers having a discontinuous surface and being a relatively non-conducting, pervious, polycrystalline ceramic-metallic composition selected from the group consisting of From 3 to less than 10% by weight palladium and from 97 to 90% by weight barium titanate,
From 5 to less than 60% by weight chromium and from 95 to 40% by weight silicon monoxide and,
From 5 to less than 20% by weight gold and from 80 to 95% by weight magnesium fluoride said relatively conducting layers being a ceramic metallic composition selected respectively from the group consisting of From 10 to 95% by weight palladium and from 90 to 5% by weight barium titanate,
From 60 to 95% by weight chromium and 40 to 5% by weight silicon monoxide and,
From 20 to 95% by weight gold, and 80 to 5% by weight magnesium fluoride.

The relatively conducting layers being sandwiched between said relatively non-conductive layer and alternate conducting layers being contacted to two separate leads.

FIGURE 1 shows a layered structure made up of non-conducting layers 10 and relatively conducting layers 11. The capacitor structure is made up by first applying the bottom non-conductive layer 10. On this, in the next step, is applied the relatively conductive layer 11. The layers 10 and 11 are then dried in an oven. The layers are then removed from the oven and additional thicknesses of non-conducting and conducting layers are applied. The combination is dried as before with the successive layers, the conducting layers 11 being sandwiched between the non-conducting layers 10. Each extend from a side but not to the opposite side. The ends of the layers 11 are connected to respective contact electrodes 12. The electrodes 12 each are provided with a suitably attached lead 13.

FIGURE 2 illustrates a modification of this invention. In the FIGURE 2 modification, a non-conductive layer 14 is laid down. A relatively conducting layer 15 is applied to the center of the layer 14. Lead 16 is attached to the electrode 15 and another non-conducting layer 14 is placed over the conducting layer 15 to sandwich it between the two layers 14. Conventional electrodes 17 are applied and a lead 18 suitably attached to each of the electrodes 17.

Although the invention has been described with particular reference to specific embodiments thereof, it will be understood that it is susceptible of embodiment in a large number of forms still within the scope of the invention. For example, the ratio between the ceramic and the metal need not be achieved through a vaporized atmosphere, but may be produced by other techniques. Another ceramic-metallic is lead barium titanate in ratio of the same order as palladium barium titanate above.

What I claim is:

1. A capacitor comprising a plurality of relatively non-conducting and relatively conducting layers, said non-conducting layers having a discontinuous surface and being a relatively non-conducting, pervious, polycrystalline ceramic-metallic composition selected from the group consisting of:

from 3 to less than 10% by weight palladium and from 97 to 90% by weight barium titanate,
from 5 to less than 60% by weight chromium and from 95 to 40% by weight silicon monoxide and,
from 5 to less than 20% by weight gold and from 80 to 95% by weight magnesium fluoride, said relatively conducting layers being a ceramic-metallic composition selected respectively from the group consisting of:

from 10 to 95% by weight palladium and from 90 to 5% by weight barium titanate,
from 60 to 95% by weight chromium and 40 to 5% by weight silicon monoxide and, from 20 to 95% by weight gold and 80 to 5% by weight magnesium fluoride, said relatively conducting layers being sandwiched between said relatively non-conducting layers and alternate conducting layers being contacted to two separate leads.

2. A capacitor comprising a plurality of relatively non-conducting and relatively conducting layers, said non-conducting layers having a discontinuous surface and being a relatively non-conducting, pervious, polycrystalline ceramic-metallic composition of from 3 to less than 10% by weight palladium and from 97 to 90% by weight barium titanate, said relatively conducting layers being a ceramic-metallic composition of from 10 to 95% by weight palladium and from 90 to 5% by weight barium titanate; the relatively conducting layers being sandwiched between said relatively non-conducting layers; alternate conducting layers being contacted to two separate leads; the overall thickness of said capacitor being not more than 20 mils.

3. A capacitor comprising a plurality of relatively non-conducting and relatively conducting layers, said non-conducting layers having a discontinuous surface and being a relatively non-conducting, pervious, polycrystalline ceramic-metallic composition of from 5 to less than 60% by weight chromium and from 95 to 40% by weight silicon monoxide, said relatively conducting layers being a ceramic-metallic composition of from 60 to 95% by weight chromium and 40 to 5% by weight silicon monoxide; the relatively conducting layers being sandwiched between said relatively non-conducting layers; alternate conducting layers being contacted to two separate leads; the overall thickness of said capacitor being not more than 20 mils.

4. A capacitor comprising a plurality of relatively non-conducting and relatively conducting layers, said non-conducting layers having a discontinuous surface and being a relatively non-conducting, pervious, polycrystalline ceramic-metallic composition of from 5 to less than 20% by weight gold and from 80 to 95% by weight magnesium fluoride, said relatively conducting layers being a ceramic-metallic composition of from 20 to 95% by weight gold and 80 to 5% by weight magnesium fluoride; the relatively conducting layers being sandwiched between said relatively non-conducting layers; alternate conducting layers being contacted to two separate leads; the overall thickness of said capacitor being not more than 20 mils.

References Cited by the Examiner

UNITED STATES PATENTS

| 2,018,343 | 10/1935 | Bienfait. | |
| 2,474,415 | 6/1949 | Deyrup | 317—261 X |
| 2,476,455 | 7/1949 | Roush | 317—261 |
| 2,883,290 | 2/1955 | Planner. | |
| 2,946,937 | 7/1960 | Herbert | 317—258 |
| 3,041,511 | 6/1962 | Peck | 317—258 X |

JOHN F. BURNS, *Primary Examiner.*

LARAMIE E. ASKIN, *Examiner.*